(12) United States Patent
Kim

(10) Patent No.: US 8,368,970 B2
(45) Date of Patent: Feb. 5, 2013

(54) IMAGE READER

(75) Inventor: Cheoul Young Kim, Suwon-Si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 574 days.

(21) Appl. No.: 12/619,349

(22) Filed: Nov. 16, 2009

(65) Prior Publication Data

US 2010/0157389 A1    Jun. 24, 2010

(30) Foreign Application Priority Data

Dec. 23, 2008   (KR) .................. 10-2008-0131946

(51) Int. Cl.
*H04N 1/04* (2006.01)
(52) U.S. Cl. ......... 358/474; 358/498; 358/497; 358/496
(58) Field of Classification Search .................. 358/474, 358/498, 497, 496
See application file for complete search history.

(56) References Cited

U.S. PATENT DOCUMENTS

| 4,258,095 A | * | 3/1981 | Larson et al. ................. 428/172 |
| 5,300,386 A | * | 4/1994 | Kanbayashi et al. ..... 430/124.31 |
| 2006/0068146 A1 | * | 3/2006 | Marks et al. ................. 428/40.1 |
| 2007/0188826 A1 | | 8/2007 | Jones et al. |

FOREIGN PATENT DOCUMENTS

JP    09-083724    3/1997

OTHER PUBLICATIONS

English language abstract of JP 09-083724, published Mar. 28, 1997.

* cited by examiner

*Primary Examiner* — Houshang Safaipour
(74) *Attorney, Agent, or Firm* — Staas & Halsey LLP

(57) ABSTRACT

Disclosed herein is an image reader. The image reader can include a reading unit receiving light reflected from a document to thereby read image of the document and an automatic document feeder configured to supply the document to the reading unit. The automatic document feeder can include a channel defined within the automatic document feeder along which the document is supplied to the reading unit such that the reading unit is able to read the image of the document as the document moves along the channel. The channel can include a component having a surface tension that is less than or equal to about 40 dyne-per-centimeter.

19 Claims, 6 Drawing Sheets

| | "REFERENCE BAR 1" (NON-TREATED WHITE PET FILM) | "REFERENCE BAR 2" (PE FILM-ADHERED WHITE PET FILM) | "REFERENCE BAR 3" (SILICON ADDITIVE-CONTAINING RESIN-COATED WHITE PET FILM) |
|---|---|---|---|
| REFLECTANCE BEFORE TEST | 90.2% | 89.7% | 90.8% |
| REFLECTANCE AFTER TEST | 75.5% | 85.1% | 88.6% |
| SURFACE TENSION | 44[dyne/cm] | 38[dyne/cm] | 36[dyne/cm] |

IMAGE READER

CROSS-REFERENCE TO RELATED APPLICATION(S)

This application claims the benefit of Korean Patent Application No. 2008-0131946, filed on Dec. 23, 2008 in the Korean Intellectual Property Office, the disclosure of which is incorporated herein by reference in its entirety.

TECHNICAL FIELD

Embodiments of the present disclosure generally relate to an image reader, and more particularly to a channel component constituting a document transfer channel of an automatic document feeder.

BACKGROUND OF RELATED ART

An image reader is used to read image information recorded in a document, and can encompass a variety of devices including facsimiles, digital copiers, multi-functional devices, and other like devices.

An image reader can include a reading unit that radiates light to a document that is placed on a document glass or that is transferred through an automatic document feeder (ADF) to read image information from that document. The reading unit can include a light source and an image sensor to receive light reflected from the document and to convert the light into an electrical signal.

A document feeder generally includes a document inlet, through which the document that is to be read enters, a document outlet, through which the read document exits after being read, and a document transfer channel configured to transfer the document from the document inlet to the document outlet. The document transferred through the document transfer channel can pass over an ADF window arranged on the document transfer channel so that the image information recorded in the document can be read by the reading unit. The document transfer channel can be provided with a reference bar to support the document such that the document can be positioned close to the ADF window.

When the document feeder is used for a long time, the channel components of the document transfer channel, such as the ADF window or the reference bar, for example, can be undesirably abraded or contaminated. In these cases, problems such as non-uniform document transfer speed and vibration of transferred document may occur, resulting in a deterioration of the quality of image read.

SUMMARY OF THE DISCLOSURE

In accordance with one aspect of the present disclosure, an image reader can may be provided to include a reading unit and an automatic document feeder. The reading unit may be configured to receive light reflected from a document. The automatic document feeder may be configured to supply the document to the reading unit. The automatic document feeder may have defined therein a document transfer channel along which the document travels within the automatic document feeder. The document transfer channel may include a component having a surface that comes in contact with the document and that has a surface tension that is less than or equal to about 40 dyne-per-centimeter.

The component of the document transfer channel may be made of one or more of a polypropylene (PP)-based resin, a polyethylene (PE) resin, a polyvinyl chloride (PVC) resin, a polyvinyl butyral (PVB)-based resin, a fluoride (F)-based resins, silicon, ethyl vinyl acetate (EVA) and amide.

The F-based resin may include one or more of polytetrafluoroethylene (PTFE), ethylene tetrafluoroethylene (ETFE), perfluoroalkoxy (PFA), polychlorotrifluoroethylene (PCTFE) and polyvinylidene fluoride (PVDF).

The component of the document transfer channel may include a base material and a surface material disposed on a surface of the base material and having a surface tension that is less than or equal to about 40 dyne-per-centimeter.

The surface material may include one or more of a PP-based resin, a PE resin, a PVC resin, a PVB-based resin, an F-based resin, silicon, EVA and amide.

The component of the document transfer channel may further include at least one intervening material disposed between the base material and the surface material. The surface tension of the intervening material may be less than that of the base material, and may be greater than that of the surface material.

The component of the document transfer channel may have a surface roughness (Ra) that ranges from about 0.3 microns (μm) to about 30 μm.

The surface of the component of the document transfer channel may be etched.

The component of the document transfer channel may include a base material having particles dispersed therein, the particles being configured to impart roughness on the surface of the base material. The component of the document transfer channel may includes a surface material adhered to the roughened surface of the base material.

According to another aspect of the present disclosure, an image reader may be provided to include a reading unit and an automatic document feeder. The reading unit may be configured to receive light reflected from a document. The automatic document feeder may be configured to supply the document to the reading unit. The automatic document feeder may have defined therein a document, transfer channel along which the document travels within the automatic document feeder. The document transfer channel may include an automatic document feeder (ADF) window through which the reading unit receives the light reflected from the document and a reference bar for positioning the document on the ADF window. At least one of the reference bar and the ADF window comprises a surface having a surface tension that is less than or equal to about 40 dyne-per-centimeter.

The at least one of the reference bar and the ADF window may be made of one or more of a PP-based resins, a PE resin, a PVC resin, a PVB-based resin, an F-based resin, silicon, EVA and amide.

The at least one of the reference bar and the ADF window may include a base material and a surface material disposed on a surface of the base material, the surface material having a surface tension that is less than or equal to about 40 dyne-per-centimeter.

The surface material may include one or more of a PP-based resin, a PE resin, a PVC resin, a PVB-based resin, an F-based resin, silicon, EVA and amide.

The surface material may be coated on the surface of the base material.

The surface material may include a film adhered to the surface of the base material.

The at least one of the reference bar and the ADF window may include at least one intervening material disposed between the base material and the surface material. The surface tension of the intervening material may be less than that of the base material and greater than that of the surface material.

The at least one of the reference bar and the ADF window may have a surface roughness (Ra) of about 0.3 microns (μm) to about 30 μm.

According to yet another aspect of the present disclosure, an automatic document feeder (ADF) window may be provided for use in an automatic document feeder of an image reader having a reading unit configured to receive light reflected from a document to thereby read image of the document. The automatic document feeder may be configured to supply the document to the reading unit. The automatic document feeder window may allow the passage of the light reflected from the document to the reading unit. The ADF window may comprise a surface having a surface tension that is less than or equal to about 40 dyne-per-centimeter.

According to even yet another aspect of the present disclosure, a reference bar may be provided for use in an automatic document feeder of an image reader having a reading unit configured to receive light reflected from a document to thereby read image of the document. The automatic document feeder may be configured to supply the document to the reading unit, and may have an automatic document feeder window for allowing passage of the light reflected from the document to the reading unit. The reference bar may be arranged on the automatic document feeder window for positioning of the document on the automatic document feeder window. The reference bar may comprise a surface having a surface tension that is less than or equal to about 40 dyne-per-centimeter.

The reference bar may have a surface roughness (Ra) of about 0.3 microns (μm) to about 30 μm.

According to even still yet another aspect of the present disclosure, an image reader may be provided to comprise an automatic document feeder and a reading unit. The automatic document feeder may have a document inlet through which a document enters the automatic document feeder, a document outlet through which the document exits the automatic document feeder and a document transfer channel along which the document moves from the document inlet to the document outlet. The document transfer channel including a document reading portion. The reading unit may be arranged adjacent the document reading portion of the document transfer channel, and may be configured to receive light reflected from the document positioned at the document reading portion. The document reading portion of the document transfer channel may include a component having a surface tension that is less than or equal to about 40 dyne-per-centimeter.

The component may comprise an automatic document feeder window configured to allow passage of the light reflected from the document to the reading unit.

The component may alternatively or additionally comprise a reference bar that may be arranged in the image reading portion of the document transfer channel for positioning of the document in relation to the reading unit.

The component of the document reading portion may have a surface roughness (Ra) of about 0.3 microns (μm) to about 30 μm.

The component of the document reading portion may have a base material having particles dispersed therein. The particles may be configured to impart roughness on the surface of the base material.

BRIEF DESCRIPTION OF THE DRAWINGS

Various aspects of the disclosure will become apparent and more readily appreciated from the following description of the embodiments, taken in conjunction with the accompanying drawings, in which.

DETAILED DESCRIPTION OF SEVERAL EMBODIMENTS

Figure 1:
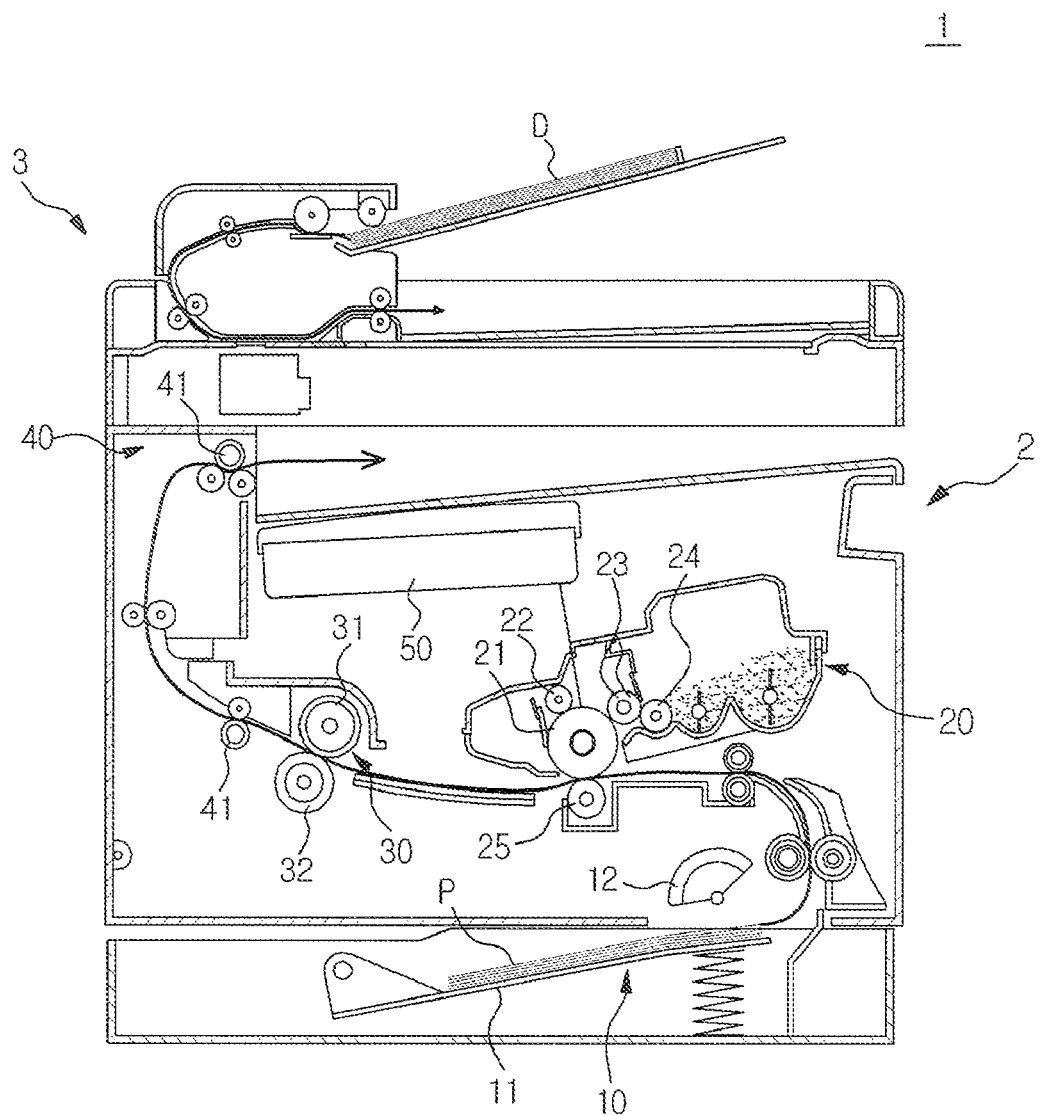
FIG. 1 is a sectional view illustrating the structure of a multi-functional device having an image reader according to an embodiment.

Reference will now be made in detail to the embodiment, examples of which are illustrated in the accompanying drawings, wherein like reference numerals refer to like elements throughout. While the embodiments are described with detailed construction and elements to assist in a comprehensive understanding of the various applications and advantages of the embodiments, it should be apparent however that the embodiments can be carried out without those specifically detailed particulars. Also, well-known functions or constructions will not be described in detail so as to avoid obscuring the description with unnecessary detail. It should be also noted that in the drawings, the dimensions of the features are not intended to be to true scale and may be exaggerated for the sake of allowing greater understanding.

Figure 2:
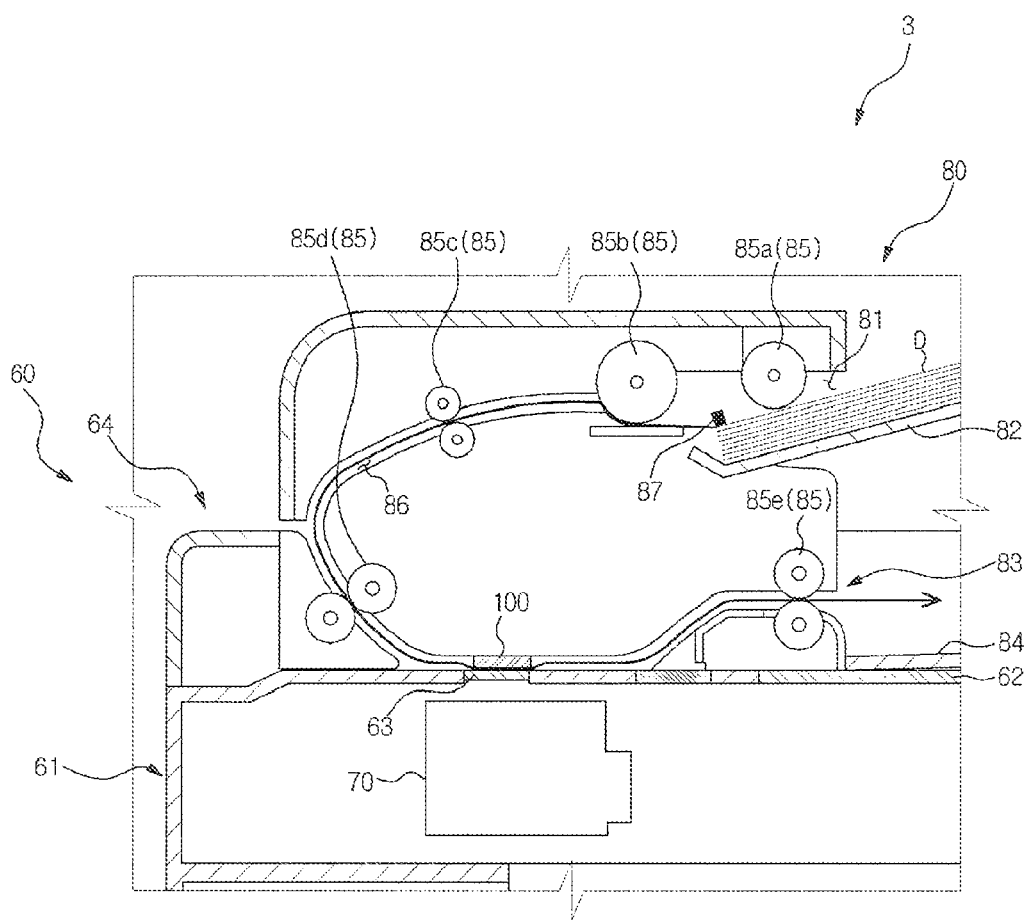
FIG. 2 is a sectional view partially enlarging the structure of the image reader according to an embodiment.

FIG. 1 is a sectional view illustrating the structure of a multi-functional device having an image reader according to an embodiment. FIG. 2 is a sectional view partially enlarging the structure of the image reader according to an embodiment.

As shown in FIG. 1, a multi-functional device 1 can include a printer 2 configured to print an image on paper or other type of printing medium, and an image reader 3 configured to read or scan an image from a document.

The printer 2 can print images based on signals received from the image reader 3 or from external devices, such as a personal computer (PC), for example, and can include a paper-feeding unit 10 configured to supply paper P as a printing medium, a developing unit 20 configured to develop an image on the paper, a setting unit 30 configured to set or fix an image on the paper by applying heat and pressure thereto and a paper-discharge unit 40 configured to discharge the printed paper out of the multi-functional device 1.

The paper-supply unit 10 can include a paper tray 11 on which paper P can be loaded, and a paper pick-up roller 12 configured to pick up the paper loaded on the paper tray 11 and to transfer the picked-up paper to the developing unit 20. The paper pick-up roller 12 can typically be configured to pick up paper one sheet at a time, for example.

The developing unit 20 can include a photoreceptor 21 on the surface of which an electrostatic latent image can be formed through an exposure unit 50, an electrification device 22, a developing roller 23 configured to supply toner to the electrostatic latent image formed on the photoreceptor 21, a feeding roller 24 configured to supply toner to the developing roller 23 and a transcribing roller 25 configured to apply pressure on the paper toward the photoreceptor 21 to transcribe or transfer a toner image formed on the photoreceptor 21 to the paper.

The setting unit 30 can include a heating roller 31 having a heat source and a pressing roller 32 disposed opposite (e.g., facing) the heating roller 31 to maintain a predetermined fixing pressure between the pressing roller 32 and the heating roller 31.

The paper-discharge unit 40 can include multiple paper-discharging rollers 41 arranged in a predetermined order and configured to discharge the paper that has passed through the fixing unit 30.

The printer 2 described above is provided by way of example, and can vary.

FIGS. 1 and 2 show the image reader 3, which can include a body 60, a reader 70 and an automatic document feeder (ADF) such as the automatic document feeder 80.

The body 60 can include a scanning frame 61 and a cover 64. The reader 70 can be provided in the scanning frame 61. Moreover, a flat window 62 and an ADF window 63 can be provided on the scanning frame 61. The cover 64 can be bound or coupled to the scanning frame 61 such that the cover 64 can expose or close the top surface of the scanning frame 61. In addition, the cover 64 can be provided with the automatic document feeder 80, which is described in greater detail below.

The reader 70 can irradiate a document D with light to read image information on the document D. According to an embodiment, the reader 70 can read the document placed on the flat window 62 while the reader 70 moves under and along the flat window 62. The reader 70 can also be arranged or positioned under the ADF window 63 to read image information recorded on a document when transferred through the automatic document feeder 80.

According to an embodiment, the reader 70 can include a light source (not shown) configured to irradiate a document with light and an image sensor (not shown) configured to collect or capture light reflected from the document and to convert the information associated with the collected light into electrical signals. The image sensor can be a Charge Coupled Device (CCD), or a Contact Image Sensor (CIS), or other like device, which can produce image signals (e.g., analog or digital signals) at a predetermined number of pixels according to a set resolution, for example.

The automatic document feeder 80 can include a document inlet 81 through which a document to be read enters the automatic document feeder 80, a document outlet 83 through which the document is discharged once it is read, one or more rollers 85 configured to transfer the document within the automatic document feeder 80 and a document transfer channel 86 defined in the cover 64, through which the document can move.

According to an embodiment, the document inlet 81 can be arranged at one side of the cover 64 and the document outlet 83 can be arranged under the document inlet 81. A document feeding area 82, in which the document D to be transferred through the automatic document feeder 80 can be loaded, can be provided near or adjacent to the document inlet 81, and a document discharge area 84, in which the document D can collected once it is read, can be provided near or adjacent to the document outlet 83.

Multiple rollers 85 can be used to transfer the document. The multiple rollers 85 can include a document pick-up roller 85a configured to pick up the document D loaded on the document feeding area 82. The multiple rollers 85 can also include a first transfer roller 85b, a second transfer roller 85c and a third transfer roller 85d. The transfer rollers may be configured to transfer the document picked up by the document pick-up roller 85a through a document transfer channel 86. The multiple rollers 85 can further include a document discharge roller 85e configured to discharge the document D that has been read to the document discharge area 84. The first transfer roller 85b, which is the closest of the transfer rollers 85b, 85c, and 85d to the document pick-up roller 85a, can be configured to separate, if necessary, the multiple documents picked up by the document pick-up roller 85a so that the separated documents are fed further along the document transfer channel 86 one at a time. To produce such separation, a friction pad 87 can be used that is disposed facing the first transfer roller 85b.

As shown in FIG. 2, according to an embodiment, the document transfer channel 86 can have a C-shape with one end of the document transfer channel 86 connected through the document inlet 81 to the document feeding area 82 while the other end of the document transfer channel 86 connected through the document outlet 83 to the document discharge area 84. The ADF window 63 can be arranged on the document transfer channel 86 such that light emitted by the light source of the reader 70 and light reflected from the document can pass through the ADF window 63. Moreover, a reference bar 100, which is configured to maintain the document close to the ADF window 63, can be provided on the document transfer channel 86.

The reference bar 100 can have a surface tension of about 40 dyne-per-centimeter (dyn/cm) or less, for example. To achieve such a surface tension, the reference bar 100 can be made of a polyethylene (PE) resin. The reference bar 100 can be made of other materials having a surface tension of 40 dyn/cm or less. Examples of other materials can include polypropylene (PP)-based resins, polyvinyl chloride (PVC) resins, polyvinyl butyral (PVB)-based resins, fluoride (F)-based resins, silicon, ethyl vinyl acetate (EVA), amide, and other like materials. The F-based resins can include polytetrafluoroethylene (PTFE) resins, ethylene tetrafluoroethylene (ETFE) resins, perfluoroalkoxy (PFA) resins, polychlorotrifluoroethylene (PCTFE) resins, polyvinylidene fluoride (PVDF) resins, and other like resins. In addition, the reference bar 100 can be made of a combination of two or more materials of the following: PE resins, PP-based resins, PVC resins, PVB-based resins, F-based resins, silicon, EVA, and amide.

Figures 3, 4:
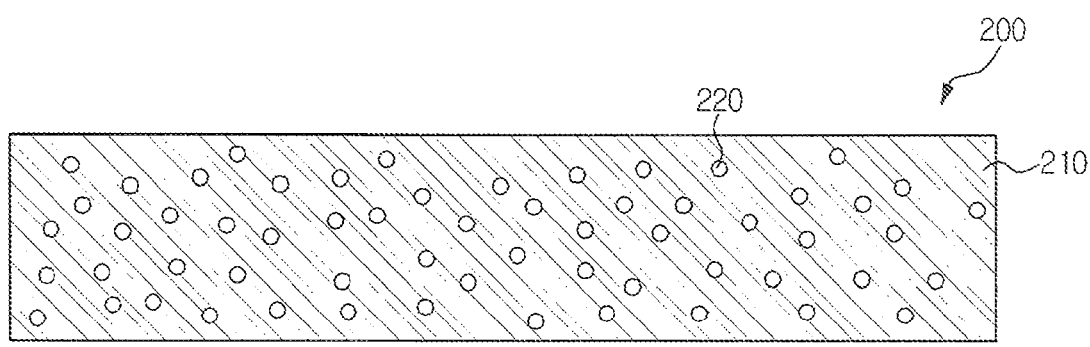
FIG. 3 is a table showing correlation between surface tension and contamination level.
FIG. 4 is a cross-sectional view illustrating a reference bar according to another embodiment.

FIG. 3 is a table that illustrates a correlation between surface tension and contamination level associated with the reference bar 100.

The reflectance (%) associated with a reference bar can be measured by seeding carbon black particles on the surface of respective reference bars and rubbing the surface with a paper 50 times. Such tests can be carried out based on the assumption that, as the contamination level caused by carbon black increases, the reflectance of the reference bar tends to decrease. In the table shown in FIG. 3, the reflectance test described above can be carried out for a non-treated white poly ethylene terephthalate (PET) film ("reference bar 1"), a white PET film, to which a PE film is adhered ("reference bar 2"), and a white PET film coated with a silicon-additive-containing resin ("reference bar 3"). The non-treated white PET film referred to as reference bar 1 above is a typical reference bar used in a typical image reader.

As shown in the table of FIG. 3, as the surface tension of the reference bar decreases, the reflectance after test is performed increases. That is, as the surface tension decreases, the contamination level of the reference bar used for the test decreases. For reference, the test herein, as described above, refers to a process for seeding carbon black particles on respective reference bar surfaces and rubbing the surfaces with paper 50 times.

The above-described results occur, at least in part, because materials having similar surface tension are highly miscible with each other or adhered to each other well. For example, water and oil have very different surface tensions and are thus poorly miscible with each other. Applying that concept to the reading environment of the image reader, most particles of contaminants present in air or on the document have a diameter (d) of several micrometers or microns (μm) to several hundred microns. Thus, a ratio of the surface area relative to volume of the particle increases. With "r" being the radius of the particle (r=d/2), the surface area of the particle can be represented by $4 \times \pi r^2$ and the volume of the particle can be represented by $4/3 \times \pi r^3$. Accordingly, as the particle radius or diameter decreases, a ratio (3/r) of the surface area of the particle to the volume of the particle increases. As such ratio increases, the area that is available for one object to collide or interfere with another object increases. As a result, particles that cause contamination tend to have a high surface tension. Particles having a diameter of several microns to several hundred microns typically have a surface tension of about 40 dyn/cm or higher and have a high surface tension that is very difficult to measure. The higher the surface tension on a reference bar in the image reader 3, the more the contamination of that reference bar by repeated use of the image reader 3 can increase.

Accordingly, because the surface tension of the reference bar 100 according to one or more embodiments described herein can be about 40 dyn/cm or less, the contamination of the reference bar 100 by repeated use of the image reader 3 can decrease. As a result, the image reader 3 can significantly reduce the occurrence of problems such as non-uniform document transfer rate, vibration of the transferred document, irregular document transfer rate by abrasion of the reference bar 100, document contamination and shading correction error.

Several additional embodiments are described below. In the description below, for the sake of brevity and clarity, the same components previously described above will not be repeatedly described, and will be referred to by the same reference numerals in the drawings.

Figure 5:
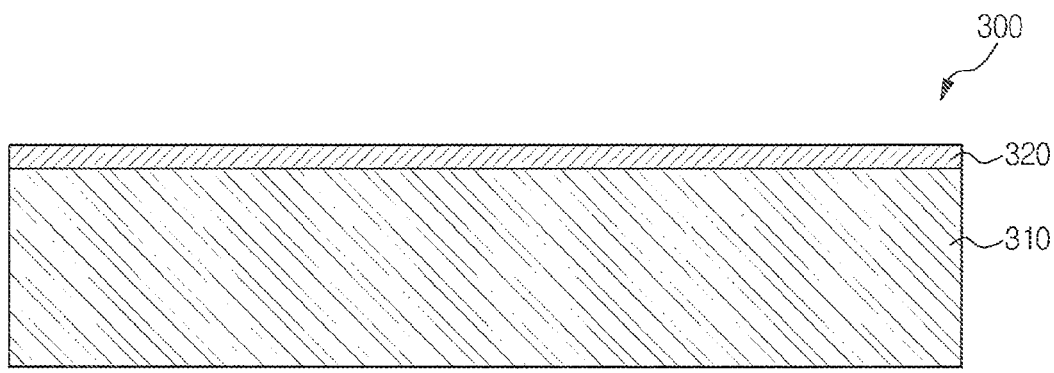
FIG. 5 is a cross-sectional view illustrating a reference bar according to another embodiment.
Figure 6:
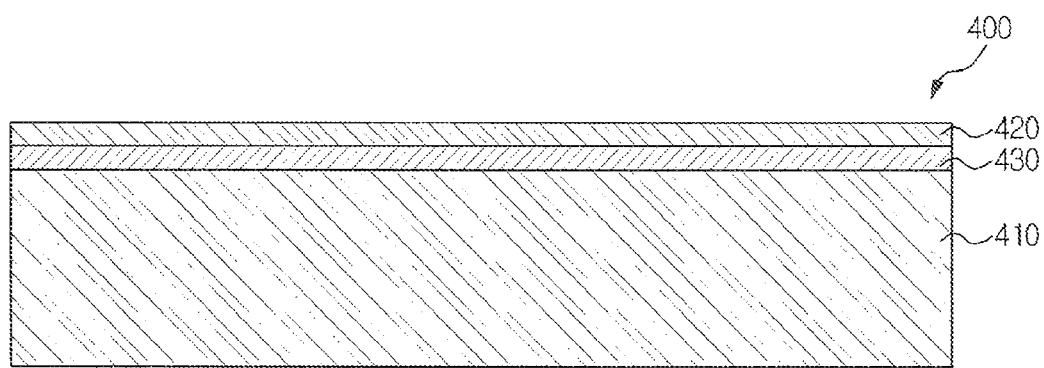
FIG. 6 is a cross-sectional view illustrating a reference bar according to another embodiment.

FIGS. 4-6 are cross sectional views illustrating reference bars according to various embodiments.

The reference bar 200 shown in FIG. 4 can include a first resin 210 and an additive 220 added thereto. The additive 220 can be made of a material having a surface tension of about 40 dyn/cm or less, for example, a PE-based resin, a PP-based resin, a PVC-based resin, a PVB-based resin, an F-based resin, silicon, EVA, amide, and other like material. The first resin 210 can include, but is not particularly limited to, an acrylate-based resin, a polyester-based resin, or a poly carbonate (PC)-based resin.

The reference bar 300 shown in FIG. 5 can include a base material 310 and a surface material 320 disposed on the surface of the base material 310. The surface material 320 can be a material having a surface tension of about 40 dyn/cm or less. Examples of the surface material 320 include PE-based resins, PP-based resins, PVC-based resins, PVB-based resins, F-based resins, silicon, EVA, amide, other like material, or combination thereof. In addition, EVA and amide can be added to other materials used in the surface material 320 to decrease the surface tension to 40 dyn/cm or less. In addition, the base material 310 can include, but is not particularly limited to, an acrylate-based resin, a polyester-based resin, or a PC-based resin. The base material 310 can be a PET film, for example. A method for bonding the base material 310 to the surface material 320 need not be particularly limited to one method, instead various methods can be used. For example, the surface material 320 can be coated on the base material or can be adhered to the base material 310 in the form of a film.

The reference bar 400 shown in FIG. 6 can include a base material 410, a surface material 420 disposed on the base material 410, and an intervening material 430 disposed between the base material 410 and the surface material 420. The surface material 420 can have a surface tension of about 40 dyn/cm or less, and the intervening material 430 has a surface tension between the surface tension of the base material 410 and the surface tension of the surface material 420.

The configuration of reference bar 400 can prevent surface contamination while improving adherence of the surface material 420. Specifically, as the difference between the surface tension of the surface material 420 and the surface tension of the base material 410 increases, the adherence between the base material 410 and the surface material 420 can weaken. To address this difference, the intervening material 430 can have a surface tension between that of the base material 410 and that of the surface material 420 to improve adherence between the surface material 420 and the base material 410 the reference bar. That is, one side of the intervening material 430 can strongly adhere to the base material 410 and the other side can strongly adhere to the surface material 420.

The reference bar 400 can include one or more intervening materials 430. When multiple intervening material 430 are used, adherence can be improved by having the surface tension of the intervening materials gradually decrease from the base material 410 to the surface material 420.

Figure 7:
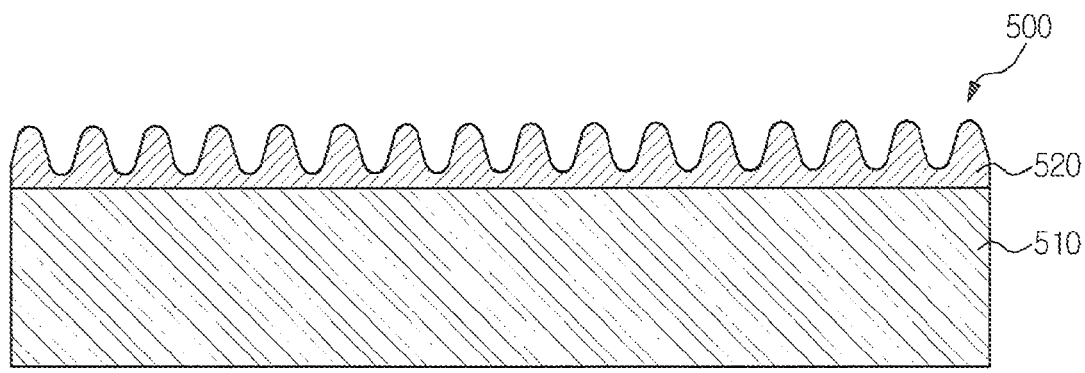
FIG. 7 is a cross-sectional view illustrating a reference bar according to another embodiment.
Figure 8:
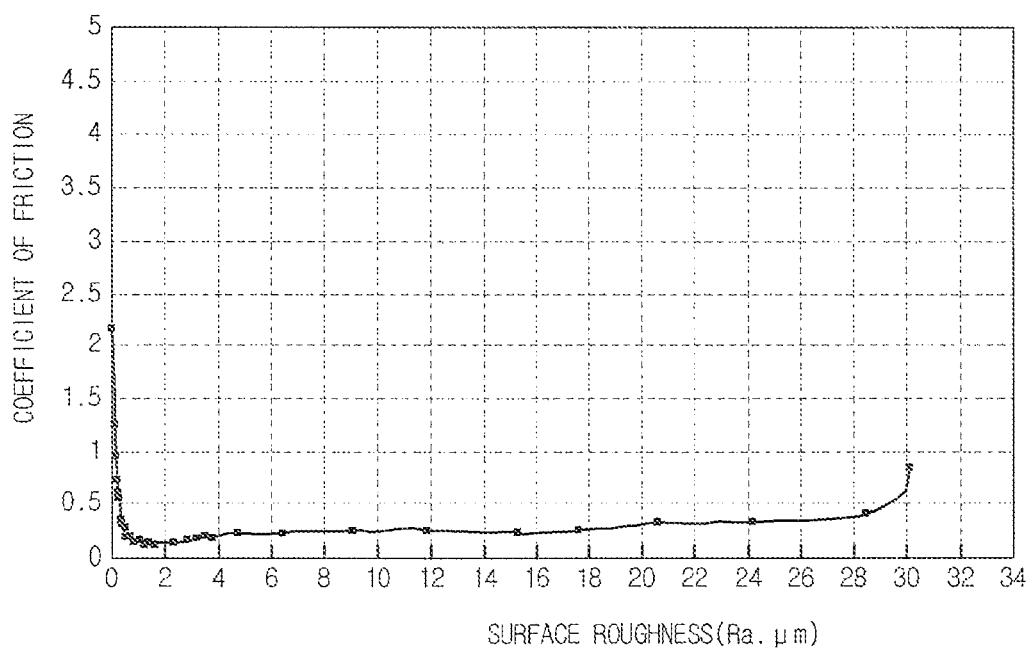
FIG. 8 is a graph showing correlation between surface roughness and coefficient of friction.
Figure 9:
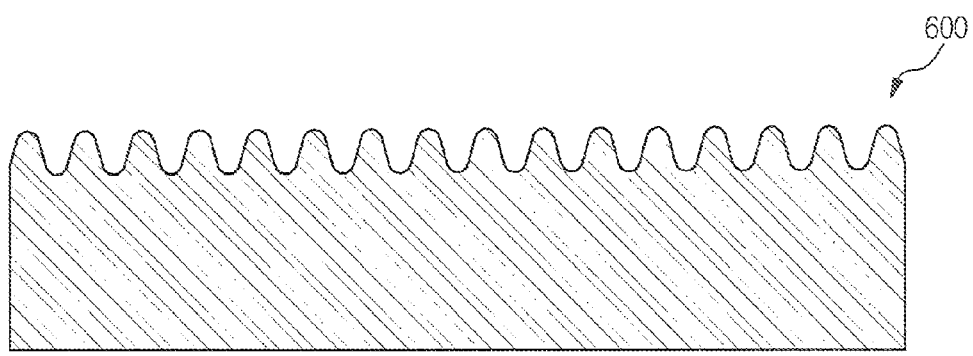
FIG. 9 is a cross-sectional view illustrating a reference bar according to another embodiment.
Figure 10:
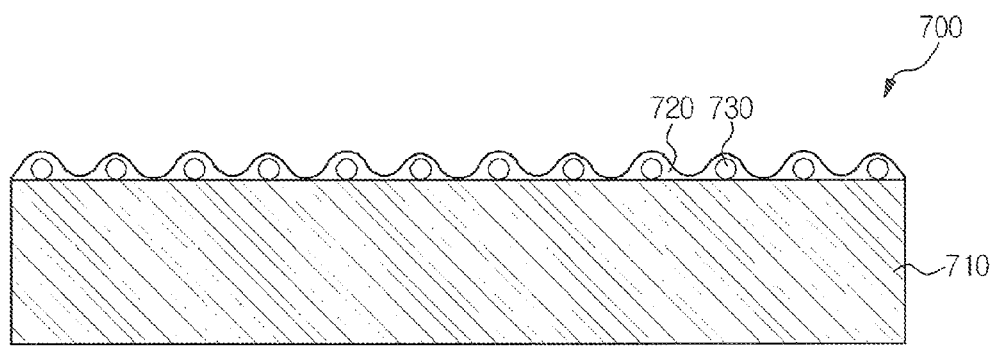
FIG. 10 is a cross-sectional view illustrating a reference bar according to another embodiment.

FIG. 7 is a cross-sectional view illustrating a reference bar according to another embodiment. FIG. 8 is a graph showing correlation between surface roughness and coefficient of friction. FIGS. 9 and 10 are cross-sectional views illustrating reference bars according to other embodiments.

Referring to FIG. 7, the reference bar 500 can include a base material 510 and a surface material 520 disposed on the surface of the base material 510, and which has a surface tension of about 40 dyn/cm or less. A surface roughness of the reference bar 500, that is, a surface roughness (Ra) of the surface material 520 can be adjusted to be between about 0.3 microns to about 30 microns. Scattering of light incident to the surface material 520 can increase, thus preventing glare on the surface of the surface material 520.

While the surface material 520 can be coated on or adhered to the base material 510, glare of the surface of the reference bar 500 can be minimized, making it possible to obtain a stable image reading. Specifically, when a document having high transparency, such as an overhead projector (OHP) film-type document, for example, passes through the reference bar, if the surface of the reference bar produces a glare, the quality of the image that is read from the document can be deteriorated. An image reader using a reference bar as described above can eliminate or reduce this problem.

Moreover, as can be seen from FIG. 8, the reference bar 500, which has a surface roughness between about 0.3 microns and about 30 microns, can have a lower and more uniform coefficient of friction. As the coefficient of friction decreases, the paper passing through the reference bar can be transferred more smoothly without causing jam. For reference, FIG. 8 is a graph showing surface roughness and coefficient of friction of the coating surface of a PET film having a silicon additive-containing resin coating.

A predetermined surface roughness can be imparted to the reference bar 500 shown in FIG. 7, by forming a pattern having a sequence of protrusions and depressions (e.g., a corrugated pattern) on the surface material 520 that is bound to the base material 510. Such a pattern can also be provided on the surface of the reference bar 600, which may made of one layer of material (See FIG. 9).

To impart surface roughness to a reference bar, physical surface corrosion can be used. That is, surface roughness can be produce by damage induced from dispersing particles, that is, particles with a diameter of between about 0.5 microns to about 100 microns on the surface of the reference bar. Moreover, chemical surface corrosion using an acid or lithography can be used to produce an appropriate surface roughness. As shown in FIG. 10, the reference bar 700 can have a structure in which surface roughness-imparting particles 730, which can having a size ranging from about 0.5 microns to about 100 microns, are dispersed on the surface of a base material 710 and a surface material 720 is coated thereon. The roughness-imparting particles 730 can be polymeric particles such as polymethylmethacrylate (PMMA), polycarbonate (PC) resins, or melamine resins, or metal particles such as gold, silver, copper, platinum, titanium, barium, zinc, calcium, aluminum, magnesium, and/or metal compounds, for example. A method for forming surface roughness need not be limited to those methods described above.

The reference bar is an example of a component of the document transfer channel of the automatic document feeder. Aspects and embodiments disclosed herein can be substantially similarly applied to other channel constituent components. For example, when the ADF window 63 of the image reader 3 has a surface tension of about 40 dyn/cm or less, the ADF window 63 can have reduced surface contamination. The ADF window 63 can be made of at least one of the following materials: PP-based resins, PE-based resins, PVC-based resins, PVB-based resins, fluoride F-based resins, silicon, EVA, and amide. The ADF window 63 can be made by coating or adhering one or more of the above-described materials to the surface of a transparent material. The ADF window 63 can have a surface roughness of about 1 micron to about 30 microns, for example.

As is apparent from the above description, an image reader according to various embodiments can improve the surface characteristics of channel components constituting a document transfer channel of an automatic document feeder.

Although several embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An image reader, comprising:
a reading unit configured to receive light reflected from a document;
and an automatic document feeder configured to supply the document to the reading unit,
wherein the automatic document feeder has defined therein a document transfer channel along which the document travels within the automatic document feeder, the document transfer channel including a component having a surface that comes in contact with the document and that has a surface tension that is less than or equal to about 40 dyne-per-centimeter,
wherein the component of the document transfer channel is made of one or more of a polypropylene (PP)-based resin, a polyethylene (PE) resin, a polyvinyl chloride (PVC) resin, a polyvinyl butyral (PVB)-based resin, a fluoride (F)-based resins, silicon, ethyl vinyl acetate (EVA) and amide, and
wherein the F-based resin includes one or more of polytetrafluoroethylene (PTFE), ethylene tetrafluoroethylene (ETFE), perfluoroalkoxy (PFA), polychlorotrifluoroethylene (PCTFE) and polyvinylidene fluoride (PVDF).

2. An image reader, comprising:
a reading unit configured to receive light reflected froma document; and
an automatic document feeder configured to supply the document to the reading unit,
wherein the automatic document feeder has defined therein a document transfer channel along which the document travels within the automatic document feeder, the document transfer channel including a component having a surface that comes in contact with the document and that has a surface tension that is less than or equal to about 40 dyne-per-centimeter, and
wherein the component of the document transfer channel includes a base material and a surface material disposed on a surface of the base material and having a surface tension that is less than or equal to about 40 dyne-per-centimeter.

3. The image reader according to claim 2, wherein the surface material includes one or more of a PP-based resin, a PE resin, a PVC resin, a PVB-based resin, an F-based resin, silicon, EVA and amide.

4. The image reader according to claim 2, wherein the component of the document transfer channel further includes at least one intervening material disposed between the base material and the surface material, and
wherein the surface tension of the intervening material is less than that of the base material and greater than that of the surface material.

5. An image reader, comprising:
a reading unit configured to receive light reflected froma document; and
an automatic document feeder configured to supply the document to the reading unit,
wherein the automatic document feeder has defined therein a document transfer channel along which the document travels within the automatic document feeder, the document transfer channel including a component having a surface that comes in contact with the document and that has a surface tension that is less than or equal to about 40 dyne-per-centimeter, and
wherein the component of the document transfer channel has a surface roughness (Ra) that ranges from about 0.3 microns (μm) to about 30 μm.

6. The image reader according to claim 5, wherein the surface of the component of the document transfer channel is etched.

7. The image reader according to claim 5, wherein the component of the document transfer channel includes a base material having particles dispersed therein, the particles being configured to impart roughness on the surface of the base material, and
wherein the component of the document transfer channel includes a surface material adhered to the roughened surface of the base material.

8. An image reader, comprising:
a reading unit configured to receive light reflected from a document; and
an automatic document feeder configured to supply the document to the reading unit, the automatic document feeder having defined therein a document transfer channel along which the document travels within the automatic document feeder, the document transfer channel including an automatic document feeder (ADF) window through which the reading unit receives the light reflected from the document and a reference bar for positioning the document on the ADF window, wherein at least one of the reference bar and the ADF window comprises a surface having a surface tension that is less than or equal to about 40 dyne-per-centimeter, and wherein the at least one of the reference bar and the ADF window includes a base material and a surface material disposed on a surface of the base material, the surface material having a surface tension that is less than or equal to about 40 dyne-per-centimeter.

9. The image reader according to claim 8, wherein the at least one of the reference bar and the ADF window is made of one or more of a PP-based resins, a PE resin, a PVC resin, a PVB-based resin, an F-based resin, silicon, EVA and amide.

10. The image reader according to claim 8, wherein the surface material includes one or more of a PP-based resin, a PE resin, a PVC resin, a PVB-based resin, an F-based resin, silicon, EVA and amide.

11. The image reader according to claim 8, wherein the surface material is coated on the surface of the base material.

12. The image reader according to claim 8, wherein the surface material includes a film adhered to the surface of the base material.

13. The image reader according to claim 8, wherein the at least one of the reference bar and the ADF window includes at least one intervening material disposed between the base material and the surface material, and wherein the surface tension of the intervening material is less than that of the base material and greater than that of the surface material.

14. The image reader according to claim 8, wherein the at least one of the reference bar and the ADF window has a surface roughness (Ra) of about 0.3 microns (μm) to about 30 μm.

15. A reference bar of an automatic document feeder of an image reader having a reading unit configured to receive light reflected from a document to thereby read image of the document, the automatic document feeder being configured to supply the document to the reading unit, the automatic document feeder having an automatic document feeder window for allowing passage of the light reflected from the document to the reading unit, the reference bar being arranged on the automatic document feeder window for positioning of the document on the automatic document feeder window, the reference bar comprising:

a surface having a surface tension that is less than or equal to about 40 dyne-per-centimeter, wherein the reference bar has a surface roughness (Ra) of about 0.3 microns (mm) to about 30 mm.

16. An image reader, comprising:

an automatic document feeder having a document inlet through which a document enters the automatic document feeder, a document outlet through which the document exits the automatic document feeder and a document transfer channel along which the document moves from the document inlet to the document outlet, the document transfer channel including a document reading portion; and a reading unit arranged adjacent the document reading portion of the document transfer channel and configured to receive light reflected from the document positioned at the document reading portion, wherein the document reading portion of the document transfer channel has a component having a surface tension that is less than or equal to about 40 dyne-per-centimeter, wherein the component of the document reading portion has a surface roughness (Ra) of about 0.3 microns (μm) to about 30 μm.

17. The image reader according to claim 16, wherein the component comprises an automatic document feeder window configured to allow passage of the light reflected from the document to the reading unit.

18. The image reader according to claim 16, wherein the component comprises a reference bar being arranged in the image reading portion of the document transfer channel for positioning of the document in relation to the reading unit.

19. The image reader according to claim 16, wherein the component of the document reading portion has a base material having particles dispersed therein, the particles being configured to impart roughness on the surface of the base material.

\* \* \* \* \*

UNITED STATES PATENT AND TRADEMARK OFFICE
CERTIFICATE OF CORRECTION

PATENT NO. : 8,368,970 B2  
APPLICATION NO. : 12/619349  
DATED : February 5, 2013  
INVENTOR(S) : Cheoul Young Kim It is certified that error appears in the above-identified patent and that said Letters Patent is hereby corrected as shown below:

In the Claims

Column 10, Line 9, In Claim 2, delete "froma" and insert -- from a --, therefor.
Column 10, Line 37, In Claim 5, delete "froma" and insert -- from a --, therefor.
Column 12, Line 10, In Claim 15, delete "microns (mm)" and insert -- microns (μm) --, therefor.
Column 12, Line 10, In Claim 15, delete "mm." and insert -- μm. --, therefor.

Signed and Sealed this
Eleventh Day of June, 2013

Teresa Stanek Rea
*Acting Director of the United States Patent and Trademark Office*